United States Patent
Wang et al.

(10) Patent No.: US 12,539,512 B2
(45) Date of Patent: Feb. 3, 2026

(54) LABEL-FREE QUANTIFICATION OF CELL SURFACE MEMBRANE PROTEIN BINDING KINETICS IN BIOLOGICAL SYSTEMS

(71) Applicant: ARIZONA BOARD OF REGENTS ON BEHALF OF ARIZONA STATE UNIVERSITY, Scottsdale, AZ (US)

(72) Inventors: Shaopeng Wang, Chandler, AZ (US); Fenni Zhang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 467 days.

(21) Appl. No.: 18/174,541

(22) Filed: Feb. 24, 2023

(65) Prior Publication Data

US 2023/0278032 A1  Sep. 7, 2023

Related U.S. Application Data

(60) Provisional application No. 63/315,155, filed on Mar. 1, 2022.

(51) Int. Cl.
*B01L 3/00* (2006.01)
*G01N 21/01* (2006.01)
(Continued)

(52) U.S. Cl.
CPC ... *B01L 3/502715* (2013.01); *B01L 3/502761* (2013.01); *G06V 10/14* (2022.01);
(Continued)

(58) Field of Classification Search
CPC .............. B01L 3/502715; G01N 21/77; G01N 15/1433; G01N 2015/1443; G06V 10/14; G06V 10/44; G06V 10/25; G02B 21/365
See application file for complete search history.

(56) References Cited

U.S. PATENT DOCUMENTS 9,909,993 B2   3/2018  Tao et al.
10,296,779 B2 * 5/2019  Moon ................. G01N 15/1433
(Continued)

FOREIGN PATENT DOCUMENTS

WO     2023039342 A1    3/2023

OTHER PUBLICATIONS

Guan, Y., Shan, X., Zhang, F., Wang, S., Chen, H. Y., & Tao, N. (2015). Kinetics of small molecule interactions with membrane proteins in single cells measured with mechanical amplification. Science advances, 1(9), e1500633. https://doi.org/10.1126/sciadv.1500633 (Year: 2015).*

(Continued)

*Primary Examiner* — Utpal D Shah
*Assistant Examiner* — Jack Peter Kraynak
(74) *Attorney, Agent, or Firm* — MH2 Technology Law Group, LLP

(57) ABSTRACT

Disclosed herein is a system and method for quantitative detection and analysis of molecular binding kinetics of a substance with surface membrane proteins of a biological object, such as a live cell, based on detecting and tracking membrane fluctuation amplitude changes caused by membrane displacement associated with the binding of the substance with the surface membrane proteins. The molecular binding kinetics can be detected with high precision in real time from an optical image of the biological object with a differential detection method.

20 Claims, 10 Drawing Sheets

(51) Int. Cl.
*G06V 10/14* (2022.01)
*G06V 10/25* (2022.01)
*G06V 10/44* (2022.01)
*G06V 10/62* (2022.01)

(52) U.S. Cl.
CPC .............. *G06V 10/25* (2022.01); *G06V 10/44* (2022.01); *G06V 10/62* (2022.01); *B01L 2400/0487* (2013.01); *G01N 2021/0106* (2013.01)

(56) References Cited

U.S. PATENT DOCUMENTS

| | | | |
|---|---|---|---|
| 10,401,298 B2* | 9/2019 | Tao | G01N 21/77 |
| 10,823,728 B2 | 11/2020 | Tao et al. | |
| 2004/0005540 A1 | 1/2004 | Petrenko et al. | |
| 2016/0169873 A1* | 6/2016 | Tao | G01N 21/77 |
| | | | 435/5 |
| 2023/0186488 A1 | 6/2023 | Wang et al. | |
| 2023/0194555 A1* | 6/2023 | Dobromyslin | B01L 3/502715 |
| | | | 356/40 |
| 2023/0288331 A1 | 9/2023 | Wang et al. | |
| 2023/0296635 A1 | 9/2023 | Wang et al. | |
| 2023/0408409 A1 | 12/2023 | Wang et al. | |

OTHER PUBLICATIONS

Jing, W., Hunt, A., Tao, N., Zhang, F., & Wang, S. (2020). Simultaneous Quantification of Protein Binding Kinetics in Whole Cells with Surface Plasmon Resonance Imaging and Edge Deformation Tracking. Membranes, 10(9), 247. https://doi.org/10.3390/membranes10090247 (Year: 2020).*

Guan, Y., Shan, X., Wang, S., Zhang, P., & Tao, N. (2014). Detection of molecular binding via charge-induced mechanical response of optical fibers. Chemical science, 5(11), 4375-4381 (Year: 2014).*

Fenni Zhang, [...], Label-Free Quantification of Small-Molecule Binding to Membrane Proteins on Single Cells by Tracking Nanometer-Scale Cellular Membrane Deformation, ACS Nano 2018 12 (2), 2056-2064, DOI: 10.1021/acsnano.8b00235 (Year: 2018).*

Ayoub et al., Homogeneous time-resolved fluorescence-based assay to monitor extracellular signal-regulated kinase signaling in a high-throughput format, Frontiers in Endocrinology, Molecular and Structural Endocrinology, Jun. 2014, vol. 5, Article 94, pp. 1-11.

Bieri et al., Micropatterned immobilization of a G protein-coupled receptor and direct detection of G protein activation, Nature Biotechnology, vol. 17, Nov. 1999, pp. 1105-1108.

Cho et al., Membrane-Protein Interactions in Cell Signaling Andmembrane Trafficking, Annu. Rev. Biophys. Biomol. Struct., 2005, 34, pp. 119-151.

Copeland et al., Drug-target residence time and its implications for lead optimization, Nature Reviews, Drug Discovery, vol. 5, Sep. 2006, pp. 730-740.

Dinitto et al., Membrane Recognition and Targeting by Lipid-Binding Domains, Science's stke, obtained from www.stke.org/cgi/content/full/sigtrans;2003/213/re16 Feb. 29, 2024, 15 pages.

Dong et al., Radioligand saturation binding for quantitative analysis of ligand-receptor interactions, Biophys Rep, 2015, 1(3), pp. 148-155.

Ehrlich, Address in Pathology, on Chemotherapy, International Medical Congress: Address in Pathology, The British Medical Journal, Aug. 16, 1913, pp. 353-359.

Englehardt et al., Viscoelastic properties of erythrocyte membranes in high-frequency electric fields, Nature, vol. 307, Jan. 26, 1984, pp. 378-380.

Escriba et al., Membrane structure and function: Relevance of lipid and protein structures in cellular physiology, pathology and therapy, Biochimica et Biophysica Acta, 1838, 2014, pp. 1449-1450.

Glickman et al., Scintillation Proximity Assays in High-Throughput Screening, Assay and Drug Development Technologies, vol. 6, No. 3, 2008, pp. 433-456.

Guan et al., Detection of molecular binding via charge-induced mechanical response of optical fibers, Chem. Sci., 2014, 5, pp. 4375-4381.

Guan et al., Kinetics of small molecule interactions with membrane proteins in single cells measured with mechanical amplification, Sci. Adv., Oct. 23, 2015, 7 pages.

Haghparast et al., Distinct mechanical behavior of HEK293 cells in adherent and suspended states, PeerJ, 2015, 3:e1131; DOI 10.7717/peerj.1131, 13 pages.

Hochmuth, Micropipette aspiration of living cells, Journal of Biomechanics, 33, 2000, pp. 15-22.

Hopkins et al., The druggable genome, Nature Reviews, Drug Discovery, vol. 1, Sep. 2002, pp. 727-730.

Jing et al., Time-Resolved Digital Immunoassay for Rapid and Sensitive Quantitation of Procalcitonin with Plasmonic Imaging, ACS Nano, 2019, 13, pp. 8609-8617.

Jing et al., Simultaneous Quantification of Protein Binding Kinetics in Whole Cells with Surface Plasmon Resonance Imaging and Edge Deformation Tracking, Membranes, 10, 247, 2020, 9 pages.

Kiernan, Formaldehyde, Formalin, Paraformaldehyde and Glutaraldehyde: What They Are and What They Do, published online at Cambrige University Press, 2000, https://doi.org/10.1017/S1551929500057060, 6 pages.

Lemmon, Membrane recognition by phospholipid-binding domains, Nature Reviews, Molecular Cell Biology, vol. 9, Feb. 2008, pp. 99-111.

Liang et al., Charge-Sensitive Optical Detection of Binding Kinetics between Phage-Displayed Peptide Ligands and Protein Targets, Biosensors 2022, 12, 394, 10 pages.

Ma et al., Three-Dimensional Tracking of Tethered Particles for Probing Nanometer-Scale Single-Molecule Dynamics Using a Plasmonic Microscope, ACS Sens. 2021, 6, pp. 4234-4243.

Miyahara et al., Evaluation of Mechanical Properties in Nanometer Scale Using AFM-Based Nanoindentation Tester, NanoStructured Materials, 1999, vol. 12, pp. 1049-1052.

Navratilova et al., Screening for GPCR Ligands Using Surface Plasmon Resonance, ACS Med. Chem. Lett., 2011, 2, pp. 549-554.

Nirschl et al., Review of Transducer Principles for Label-Free Biomolecular Interaction Analysis, Biosensors, 2011, 1, pp. 70-92.

Oueslati et al., Time-Resolved FRET Strategy to Screen GPCR Ligand Library, G Protein-Coupled Receptor Screening Assays, Methods in Molecular Biology, vol. 1272, pp. 23-36.

Owicki, Fuorescence Polarization and Anisotropy in High Throughput Screening: Perspectives and Primer, Journal of Biomolecular Screening, vol. 5, Nov. 5, 2000, pp. 297-306.

Pei et al., Real-time analysis of the carbohydrates on cell surfaces using a QCM biosensor: a lectin-based approach, Biosensors and Bioelectronics, 35, 2012, pp. 200-205.

Pretini et al., Red Blood Cells: Chasing Interactions, Frontiers in Physiology, Jul. 2019, vol. 10, Article 945, 17 pages.

Subramanian et al., Insulin receptor-insulin interaction kinetics using multiplex surface plasmon resonance, J. Mol. Recognit., 2013, 26, pp. 643-652.

Tse et al., Quantitative Diagnosis of Malignant Pleural Effusions by Single-Cell Mechanophenotyping, www.ScienceTranslationalMedicine.org, Nov. 20, 2013, vol. 5, Issue 212 212ra163, 9 pages.

Wang et al., Label-free measuring and mapping of binding kinetics of membrane proteins in single living cells, Nature Chemistry, vol. 4, Oct. 2012, pp. 848-853.

Waugh et al., Thermoelasticity of Red Blood Cell Membrane, Biophys. J. Biophysical Society, vol. 26, Apr. 1979, pp. 115-132.

Wirtz, Particle-Tracking Microrheology of Living Cells: Principles and Applications, Annu. Rev. Biophys., 2009, 38, pp. 301-326.

Zhang et al., Optical tweezers for single cells, J. R. Soc. Interface, 2008, 5, p. 671-690.

Zhang et al., Quantification of Epidermal Growth Factor Receptor Expression Level and Binding Kinetics on Cell Surfaces by Surface Plasmon Resonance Imaging, Anal. Chem., 2015, 87, pp. 9960-9965.

(56) References Cited

OTHER PUBLICATIONS

Zhang et al., Label-Free Quantification of Small-Molecule Binding to Membrane Proteins on Single Cells by Tracking Nanometer-Scale Cellular Membrane Deformation, ACS Nano, 2018, 12, pp. 2056-2064.

Zhang et al., Label-free imaging and biomarker analysis of exosomes with plasmonic scattering microscopy, Chem. Sci., 2022, 13, pp. 12760-12768.

Zhao et al., Magnetic Nanoparticle Tracking for One-Step Protein Separation and Binding Kinetics Analysis, Journal of the Electrochemical Society, 2022, 169, 057509, 8 pages.

Zhen et al., Use of radiolabeled antagonist assays for assessing agonism at D2 and D3 dopamine receptors: Comparison with functional GTPyS assays, Journal of Neuroscience Methods, 248, 2015, pp. 7-15.

Wang, W., et al., Label-free measuring and mapping of binding kinetics of membrane proteins in single living cells. Nature Chemistry, 2012. 4(10): p. 846-853.

Guan, Y., et al., Kinetics of small molecule interactions with membrane proteins in single cells measured with mechanical amplification. Sci Adv, 2015. 1(9): p. e1500633.

Zhang, F.N., et al., Quantification of Epidermal Growth Factor Receptor Expression Level and Binding Kinetics on Cell Surfaces by Surface Plasmon Resonance Imaging. Analytical Chemistry, 2015. 87(19): p. 9960-9965.

Zhang, F., et al., Quantification of epidermal growth factor receptor expression level and binding kinetics on cell surfaces by surface plasmon resonance imaging. Anal Chem, 2015. 87(19): p. 9960-5.

Zhang, F., et al., Label-Free Quantification of Small-Molecule Binding to Membrane Proteins on Single Cells by Tracking Nanometer-Scale Cellular Membrane Deformation. ACS Nano, 2018. 12(2): p. 2056-2064.

Jing, W., et al., Simultaneous Quantification of Protein Binding Kinetics in Whole Cells with Surface Plasmon Resonance Imaging and Edge Deformation Tracking. Membranes (Basel), 2020. 10(9).

* cited by examiner

LABEL-FREE QUANTIFICATION OF CELL SURFACE MEMBRANE PROTEIN BINDING KINETICS IN BIOLOGICAL SYSTEMS

CROSS-REFERENCE TO RELATED APPLICATIONS

This application claims the benefit of U.S. Provisional Application No. 63/315,155 filed Mar. 1, 2022, the disclosure of which is incorporated herein in its entirety.

STATEMENT REGARDING FEDERALLY SPONSORED RESEARCH

This invention was made with government support under R01 GM124335 awarded by the National Institutes of Health. The government has certain rights in the invention.

FIELD

The present disclosure relates to the field of biomedical research, screening and development of drugs, and discovery, validation and detection of biomarkers for diseases, and, more particularly, to a method based on nanometer-precision tracking of the cellular membrane fluctuations via optical imaging, which is label-free, real time and non-invasive.

BACKGROUND

Molecular interactions on cell surface are responsible for relaying signals between a cell and its external environment, and moving ions and molecules across the cell membrane, which allows the cell recognizing other cells and attaching to a surface, all vital for the survival of living organisms. Quantification of the molecular interaction between membrane proteins and their ligands is also important for biomarker discovery, disease diagnosis and drug screening, as the membrane proteins are accounting for over a half of all drug targets. For studying the cellular functions and discovering new drugs, it is necessary to measure the interactions of membrane proteins with various ligand and drug candidate molecules and to quantify the binding kinetics for determination of the binding rate and strength and for evaluation of drug potency and efficacy.

Despite the importance, in situ quantification of the membrane protein binding kinetics on live cells has been a difficult task. The typical approach to study molecular interactions for drug discovery is to use radioactive or fluorescent labels. Although sensitive, these methods are normally end-point detection. To determine the kinetics, the current practice is to extract the membrane proteins from the cell membranes and measure the binding with a label-free detection technology, such as surface plasmon resonance (SPR), quartz crystal microbalance (QCM) and Bio-layer interferometry, in which the protein extraction process is laborious, and often difficult because of the low solubility and low expression levels of many membrane proteins. Furthermore, the isolated membrane proteins may lose their native structures and functions outside their original lipid environment. Studying membrane proteins in the native cellular membranes is thus important. The in-situ quantification of molecular interaction on cell surface with surface plasmon resonance imaging (SPRi) and mechanical amplification detection for both monoclonal antibody and small molecules detection has been previously reported. However, both methods mainly worked with fixed cells, as live cell signal is often affected by the cell micromotion related noises.

Accordingly, there remains a need for effective methods of measuring and quantifying molecular binding to membrane proteins on single live cells.

SUMMARY

The present disclosure is directed to a system and a method for quantitative detection and analysis of molecular binding kinetics of a substance with surface membrane proteins of a biological object, such as a biological cell, tissue or virus. The disclosed system and methods works for both large and small molecules, including but not limited to proteins, nucleic acids, amino acids, peptides, hormones, drugs, metabolites, minerals, and ions. The disclosed systems and methods are based on detecting and tracking membrane fluctuation amplitude changes cause by membrane displacement associated with the binding of the substance with the surface membrane proteins. The molecular binding kinetics can be detected with high precision in real time from an optical image of the biological object with a differential detection method.

BRIEF DESCRIPTION OF THE DRAWINGS

The accompanying drawings, which are incorporated in and constitute a part of this specification, illustrate certain embodiments, and together with the written description, serve to explain certain principles of the methods and devices disclosed herein.

DETAILED DESCRIPTION

Figure 1:
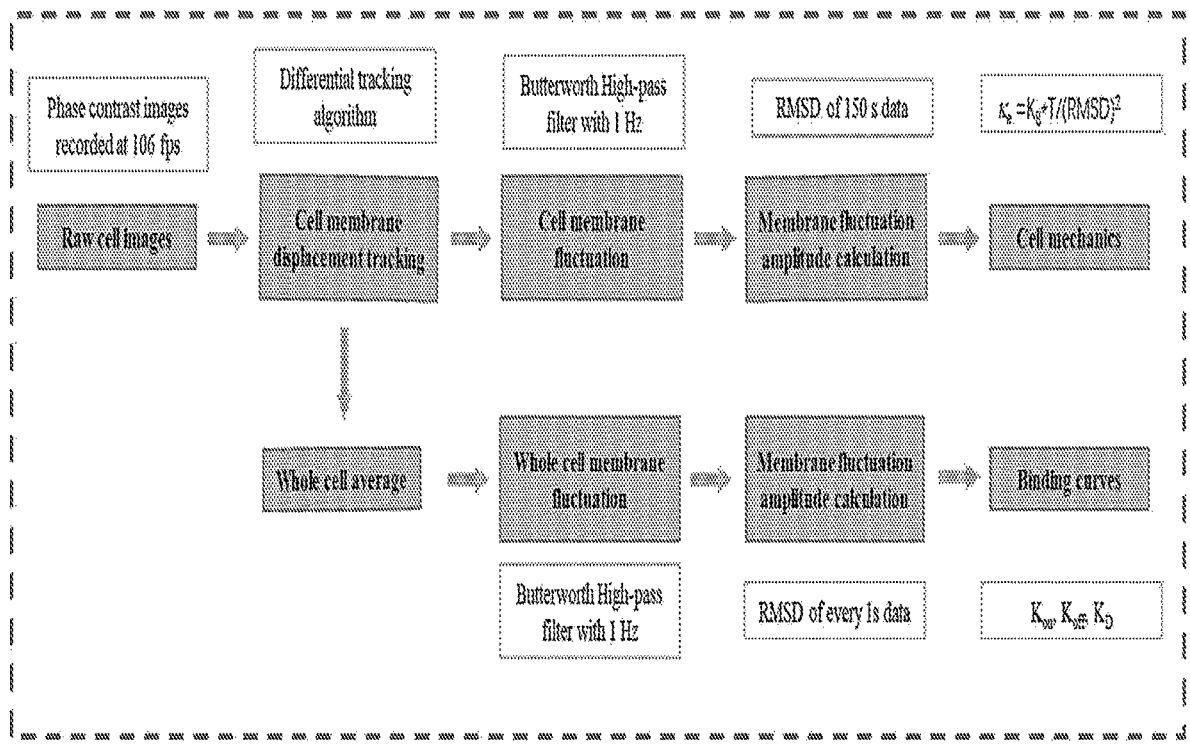
FIG. 1 depicts a flow chart for cell mechanics and binding kinetics measurement on live cells.

Reference will now be made in detail to various exemplary embodiments, examples of which are illustrated in the accompanying drawings. It is to be understood that the following detailed description is provided to give the reader a fuller understanding of certain embodiments, features, and details of aspects of the disclosure, and should not be interpreted as a limitation of the scope of the disclosure.

Definitions

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

The term "about" is used herein to mean within the typical ranges of tolerances in the art. For example, "about" can be understood as about 2 standard deviations from the mean. According to certain embodiments, when referring to a measurable value such as an amount and the like, "about" is meant to encompass variations of ±20%, ±10%, ±5%, ±1%, ±0.9%, ±0.8%, ±0.7%, ±0.6%, ±0.5%, ±0.4%, ±0.3%, ±0.2% or ±0.1% from the specified value as such variations are appropriate to perform the disclosed methods and/or to make and use the disclosed devices. When "about" is present before a series of numbers or a range, it is understood that "about" can modify each of the numbers in the series or range.

The term "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The term "at least" prior to a number or series of numbers (e.g., "at least two") is understood to include the number adjacent to the term "at least," and all subsequent numbers or integers that could logically be included, as clear from context. When "at least" is present before a series of numbers or a range, it is understood that "at least" can modify each of the numbers in the series or range.

The term "biological object," as used herein in the specification and in the claims, refers to a biological entity having surface proteins, particularly surface membrane proteins. In some embodiments, the "biological object" is a virus. In some embodiments, the "biological object" is a tissue. In some embodiments, the "biological object" is a biological cell, such as a blood cell. In some embodiments, the "biological object" is a red blood cell.

Unless the context requires otherwise, throughout the specification and claims which follow, the word "comprise" and variations thereof, such as, "comprises" and "comprising" are to be construed in an open, inclusive sense that is as "including, but not limited to."

As used herein, the term "in some embodiments" refers to embodiments of all aspects of the disclosure, unless the context clearly indicates otherwise.

As used herein, "plurality" is understood to mean more than one. For example, a plurality refers to at least 3, 4, 5, 70, or more.

The terms "protein" and "polypeptide" are used interchangeably herein and refer to a biological molecule consisting of one or more peptides, regardless of post-translational modification. Each peptide in a protein may be a subunit. The protein or polypeptide may be in a native or modified form, and may exhibit a biological function or characteristics.

Principle of the System and Method

The systems and methods disclosed herein are based on measuring the membrane fluctuation dynamics of a biological object, such as a red blood cell, by tracking the cell membrane displacement during interaction with a substance, such as a drug, and obtaining binding kinetics of the substance with surface membrane proteins of the biological object by tracking the membrane fluctuation amplitude changes on single live cells in real time. Tracking fluctuation rather than deformation of cell membrane (AC signal instead of DC signal) makes the disclosed systems and methods less sensitive to environmental noise and cell movement.

To image the live cell membrane fluctuations without external perturbations, a mechanically stable optical imaging system equipped with a 40× phase contrast objective and a camera equipped with an image sensor is used in the systems and methods disclosed herein. An image sensor or imager is a sensor that detects and conveys information used to make an image. It does so by converting the variable attenuation of light waves (as they pass through or reflect off objects) into signals, small bursts of current that convey the information. The waves can be light or other electromagnetic radiation. The charge-coupled device (CCD) and the active-pixel sensor (CMOS sensor) are the two main types of electronic image sensors and both are based on metal-oxide-semiconductor (MOS) technology, with CCDs based on MOS capacitors and CMOS sensors based on MOSFET (MOS field-effect transistor) amplifiers. Accordingly, in some embodiments, a camera equipped with a CCD, or a CCD camera, is used in the systems and methods disclosed herein to image the live cell membrane fluctuations. In other embodiments, a camera equipped with a CMOS sensor, or a CMOS camera, is used in the systems and methods disclosed herein to image the live cell membrane fluctuations.

In addition to the optical imaging system, an optical imaging compatible microfluidic system is also implemented to introduce the substance to the cells. The cells are imaged with 40× phase contrast objective to reveal the cell edge for membrane displacement tracking.

To obtain the membrane fluctuation, a high-pass filter (>1 Hz) is applied to the measured membrane displacement and the typical time trace of cell membrane fluctuations over 150 s is plotted which reveals large fluctuations compared to the time trace of the background noise. To quantify the cell membrane fluctuation, the root mean square displacement (RMSD) of the fluctuation signal is calculated.

For membrane motion detection in live cells, the fast timescale membrane fluctuation is extracted for binding kinetic measurements. First, the tracked binding curve is filtered with a high pass filter to eliminate the slow-motion changes below 1 Hz, and obtained the high frequency membrane fluctuations. Then, the fluctuation amplitude (RMSD) was extracted every 1 s for binding curve plot.

The systems and methods disclosed herein measure the molecular binding induced fast timescale cell membrane fluctuations change of live cells, such as red blood cells, with sub-nanometer precision. Moreover, the high-precision membrane fluctuation tracking systems and methods disclosed herein provide a non-invasive way for both cell mechanics and molecular binding interaction measurement. The systems and methods disclosed herein can thus contribute to the understanding of mechanisms of live cell interaction with any substance, such as a drug candidate. The systems and methods disclosed herein can also have a wide range of applications, such as drug evaluation and mechanical assessment of cancer or other diseases at the single-cell level.

EXAMPLES

Example 1. Label-Free Quantification of Cell Surface Membrane Protein Binding Kinetics by Tracking Nanometer Scale Cell Membrane Fluctuations Taking advantages of the intrinsic micro-motion of single live cell, we developed an optical imaging method to measure the molecular binding to membrane proteins on live cells by tracking the cellular mechanical fluctuations with sub-nm precision. This label-free method offers a unique capability of measuring molecular binding to membrane proteins on single live cells in real time. We demonstrate this capability by measuring the binding kinetics of glycoproteins on single red blood cells. Red blood cells are fundamental for the nearly all basic physiologic dynamics and are able to interact with proteins, endothelial cells, platelets, macrophages, and bacteria. The mechanisms of molecular interactions of red blood cells are critical for understanding its biological functions and for disease study. We establish the basic principle of the method by tracking the membrane fluctuations of live red blood cells, perform spectral analysis of the fluctuations, and compare the data with a thermodynamic model. More specifically, we measured the membrane fluctuation dynamics by tracking the red blood cells membrane displacement during glycoprotein interaction and analyzed the data with a thermodynamic model to determine the elastic properties of the cell. We found fixatives reduced membrane fluctuations, indicating cell fixations affect cell membrane mechanical properties. By fitting the measured membrane fluctuations with the thermodynamic model, we extract mechanical parameters of the red blood cells under different glycoprotein interactions and obtained the binding kinetics by tracking the membrane fluctuation changes on single live cells. We obtained cell surface membrane glycoprotein binding kinetics to several lectins by tracking the membrane fluctuation amplitude changes on single live cells and found that the binding kinetics and strength of different lectins are quite different, indicating the heterogeneity of glycoproteins expression in single cells. This proves that our method is suitable for evaluation of the glycoprotein expression profile and for further understanding the structure and functions of red blood cells, which has not been investigated before, especially in single live cells. We anticipate that the method disclosed herein will contribute to the understanding of mechanisms of cell interaction, such as red blood cell interaction, as well as wide-range applications, such as mechanical assessment of cancer or other diseases at the single-cell level.

1. MATERIALS AND METHODS i. Materials

Alsever's solution, N-acetylglucosamine (GlcNAC) and all lectins including wheat germ agglutinin (WGA, molecular weight, 35 kDa), *Ricinus communis* (RCA$_{120}$, molecular weight, 120 kDa), concanavalin A from *Canavalia ensiformis* (Con A, molecular weight, 53 kDa), lectin from *Phaseolus vulgaris* (PHA, molecular weight, 128 kDa) and lectin from *Pisum sativum* (PSA, molecular weight, 48 kDa) were bought from Sigma-Aldrich (St. Louis, MO, USA). All reagents were analytical grade from Sigma-Aldrich, except stated.

ii. Immobilization and Culture of Red Blood Cells on Glass Slide

Red blood cells were purchased from Immucor (Norcross, GA, USA). Suspensions of red blood cells were prepared by diluting with 1× Alsever's solution. A piece of glass coverslip (100 um thick) was cleaned and treated with oxygen plasma (BD-20, 60 Hz, Electro-technic products, IL, USA) for about 1 minute. Then a home-made polydimethylsiloxane (PDMS) chamber (7 mm diameter, 5 mm thick) was attached to the surface of glass slide. 20 uL of RBC suspension was added to the surface of glass slide then cultured in a humidified container at 4° C. overnight. Before experiments, the glass slide with red blood cells was rinsing with Alsever's solution for three times, removing the floating cells and their debris. The slide was put on the platform of microscope. Buffer and reagents were injected and drained with a flow system.

iii. Optical Tracking of Cell Fluctuation

An inverted microscope (Olympus IX-81) equipped with a top illuminating white light, a phase contrast condenser and 40× phase contrast objective was used as the imaging device. The microscope is placed on an optical table (Newport RS4000) with passive vibration isolation. The attached red blood cells in the PDMS chamber were imaged from bottom with a CCD camera (AVT Pike F032B) at a frame rate of 106 frames per second (fps). The spatial resolution of the images is about 0.5 μm. The binding-induced cell fluctuation was determined in nm-precision with a differential detection algorithm (FIG. 1). First, the edge of the cell was manually chosen, and the center of the cell was determined. Then, the calibration curve at each location along the cell edge was obtained by shifting the region of interest (ROI) (1.11×2.22 μm) from outside to inside of the cell, in the direction perpendicular to the cell edge. Using the calibration curves, the cell deformation (edge movement) at each point along the cell edge was determined. For cell mechanics determination, the membrane displacement was filtered with a Butterworth high-pass filter (>1 Hz) for membrane fluctuation tracking, and the fluctuation amplitude was calculated with the root mean square displacement (RMSD) of the 150 seconds membrane fluctuation signal. To model the cell mechanics, a fluctuation-based approach was used to determine the effective local spring constant $\kappa_e = k_B T/(RMSD)^2$. For binding kinetics determination, the membrane displacement was averaged over the whole to improve signal to noise ration. Then, the whole cell membrane displacement was filtered with a Butterworth high-pass filter (>1 Hz) for membrane fluctuation tracking, and the fluctuation amplitude was calculated with the RMSD of every 1 second membrane fluctuation for binding curve determination. To fit the binding kinetic constants, a 1:1 binding kinetics model was used to determine the association rate constant ($k_{on}$), dissociation rate constant ($k_{off}$), and dissociation constant ($K_D$).

2. RESULTS AND DISCUSSION i. Detection Principle

To measure cellular membrane fluctuations and mechanical properties, various techniques, such as micropipette aspiration, atomic force microscopy (AFM), optical tweezers, microrheology, and deformability cytometry, have been developed. These techniques measure a mechanical deformation in the cellular membrane in response to an applied force or by injecting particle probes into the cells, which are thus invasive. This is especially the case for living cells, which actively respond to external perturbations or stresses.

Figure 2:
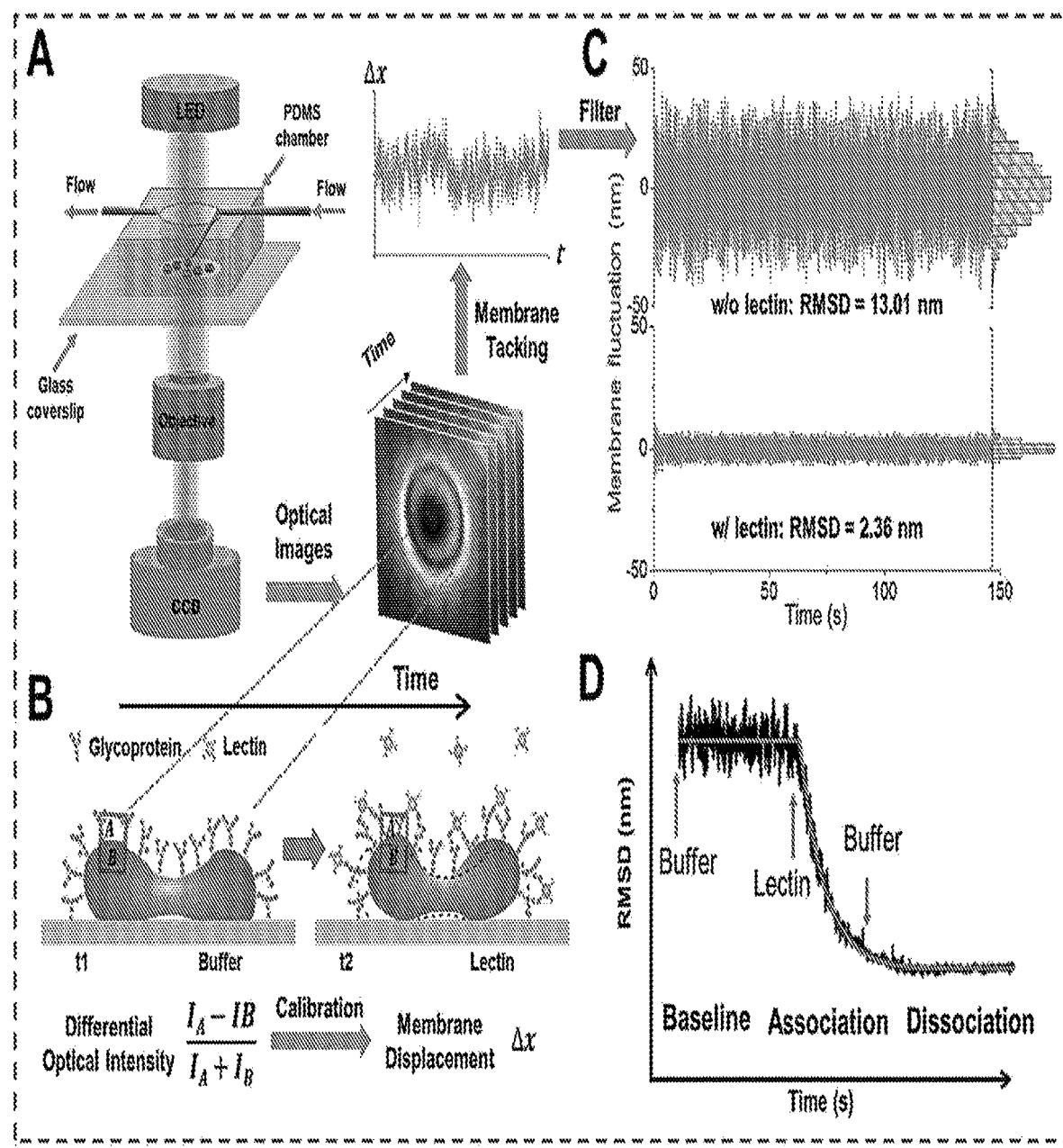
FIG. 2 depicts the principle and setup for measuring molecular interaction on single live cells. (A) Schematic illustration of the optical setup with a 40× phase contrast objective and a microfluidic system for attaching red blood cells, and for introducing ligand molecules for single live cell imaging and tracking. (B) Illustration of the differential optical tracking algorithm for real time cell membrane displacement detection. Insets: Cell edge positions before binding (t1), and during binding (association) (t2), where the darker and lighter shaded boxes indicate a region of interest (ROI) used in the differential optical tracking algorithm of the cell membrane displacement. (C) A representative tracked membrane displacement of a live red blood cell before ("w/o lectin," upper panel) and after ("w/lectin," lower panel) lectin binding. (D) A representative binding kinetic curve determined from the tracked live cell membrane fluctuation.
Figure 3:
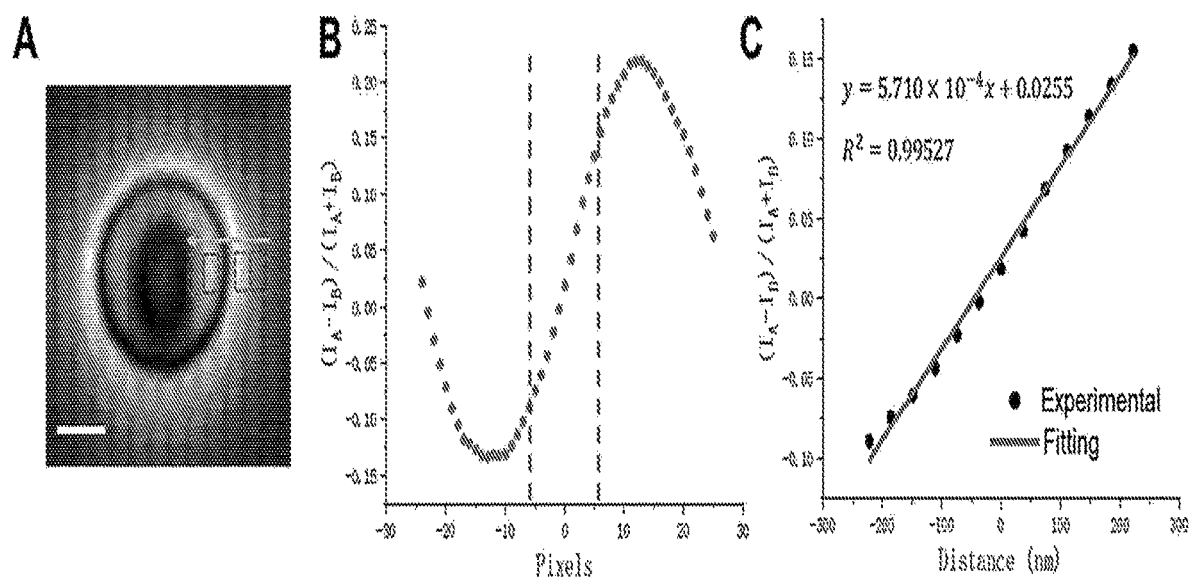
FIG. 3 depicts the calibration of the differential imaging intensity and cell membrane displacement. (A) Calibration the differential detection by shifting the ROI by different numbers of pixels from outside to inside of the cell, in the direction perpendicular to the tangent line at the cell boundary. (B) Differential image intensity vs. shifting of the ROI shown in (A). The region between two vertical lines is a linear relation between differential image intensity and cell edge movement. (C) A typical calibration curve to determine the cell edge movement (mechanical deformation) from the differential image intensity. Scale bar: 2 μm.

To image the live cell membrane fluctuations without external perturbations, we built a mechanically stable optical imaging system equipped with a 40× phase contrast objective and a CCD camera (FIG. 2). An optical imaging compatible microfluidic system was implemented for cell culturing and liquid handling. To measure the small binding induced cell deformation, we used a differential detection algorithm to measure the cellular membrane deformation. The algorithm first defined a rectangular ROI including the edge of the cell image, and then divided the ROI into two halves along the edge, with intensities denoted by A and B, respectively. As the membrane moves, A decreased and B increased, or vice versa, and (A−B)/(A+B) was calculated. We found that the lateral displacement (Δh) was linearly proportional to (A−B)/(A+B) within a certain range (about 300 nm), given by $$\Delta h = \alpha \frac{A-B}{A+B}, \quad (1)$$

where α is a calibration factor, which can be determined by shifting the ROI by different numbers of pixels from outside to inside of the cell, in the direction perpendicular to the tangent line at the cell boundary (FIG. 3). The differential optical detection method subtracted the common noise (e.g., light intensity and mechanical perturbation) in the optical system, thus providing precise tracking of subtle cell deformation associated with the molecular binding. The standard deviation of the cell deformation averaged over a cell was about 0.4 nm.

ii. Measurement of the Cell Membrane Fluctuations

To test the performance of the optical imaging system and the differential optical detection algorithm, we measured the membrane fluctuations of live red blood cells and those under glutaraldehyde treatment, and the corresponding power spectral density (PSD) was obtained using fast Fourier transform (FFT) for spectrum analysis. First, the red blood cells were immobilized and cultured on a glass coverslip prior to measurement. For glutaraldehyde treatment, different concentrations (0.05%, 0.10%, 0.20% in PBS, pH 7.4) of glutaraldehyde solutions were introduced to the red blood cell for 10 minutes treatment at room temperature. Then, the red blood cells were imaged with 40× phase contrast objective to reveal the cell edge for membrane displacement tracking. To obtain the membrane fluctuation, a high-pass filter (>1 Hz) was applied to the measured membrane displacement and the typical time trace of cell membrane fluctuations over 150 seconds is plotted in FIG. 4, (A), which reveals large fluctuations compared to the time trace of the background noise (FIG. 5, (A)). The PSD of the red blood cell membrane fluctuations is plotted in FIG. 4, (B), which also shows substantially larger amplitude than the background noise (FIG. 5, (B)) from 1 Hz to 55 Hz.

To quantify the cell membrane fluctuation, the root mean square displacement (RMSD) of the fluctuation signal, was calculated, which is about 13.19 nm for the normal red blood cell. In thermal equilibrium, cell membrane fluctuations depend on the cell mechanical properties. To model the cells' elastic properties, we simply used a fluctuation-based approach. Using the equipartition theorem, the observed fluctuation amplitude at a point on the membrane, RMSD, determines the effective local spring constant $\kappa_e = k_B T/(RMSD)^2$. With the measured RMSD (about 13.19 nm), the effective local spring constant ice of the representative red blood cell was calculated to be about 23.7 μN/m, which is consistent with those measured by micropipette aspiration and electric field deformation.

Figure 4:
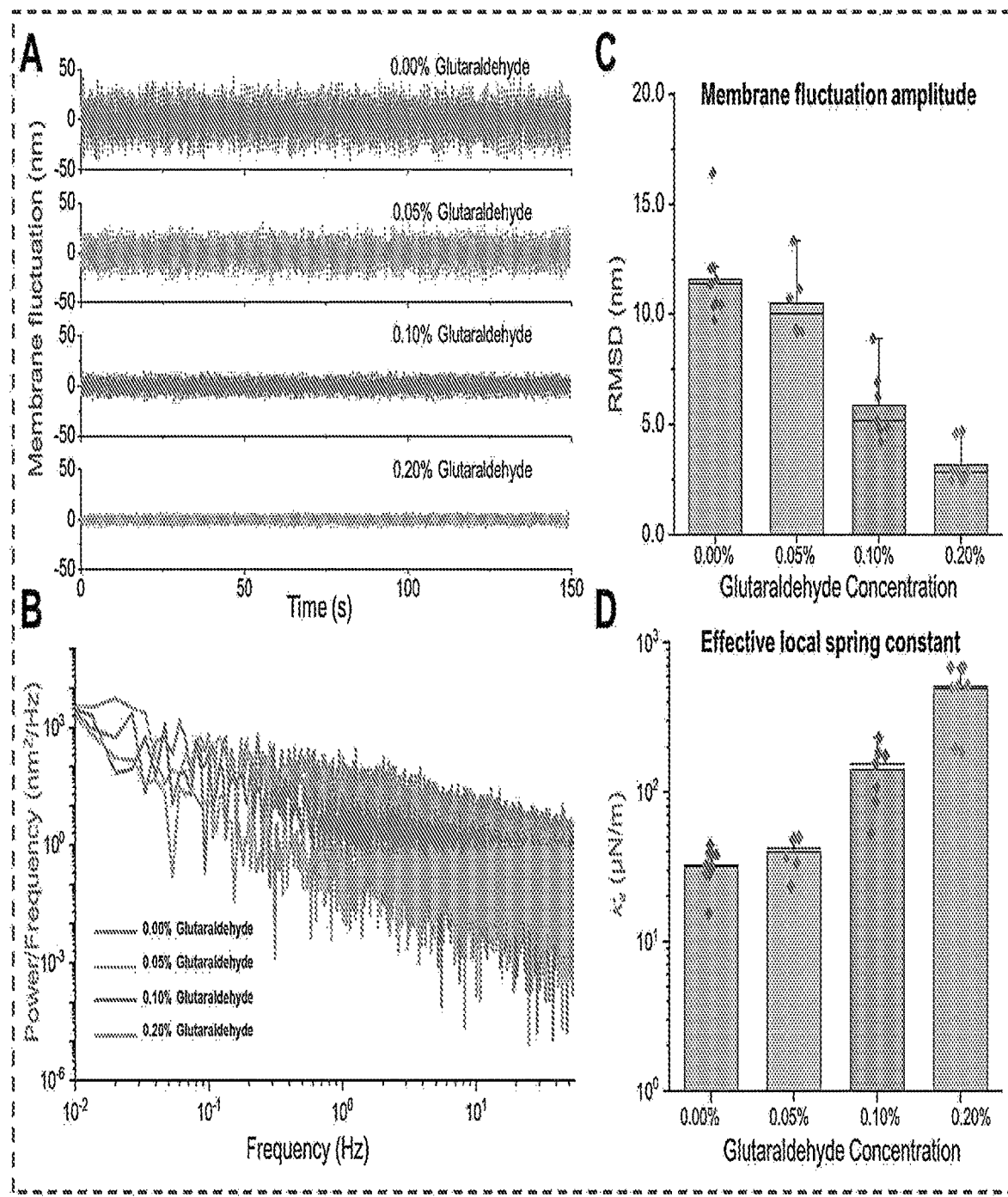
FIG. 4 depicts the representative measurement of the cell membrane fluctuations. (A) Representative membrane fluctuations of live red blood cells under glutaraldehyde treatments with different concentrations. (B) The corresponding power spectrum density (PSD) spectrum of the cell membrane fluctuations. (C) Statistic of the membrane fluctuation amplitude of multiple red blood cells with glutaraldehyde treatments. (D) Statistic of the calculated effective local spring constant $\kappa_e$ of multiple red blood cells with glutaraldehyde treatments.
Figure 5:
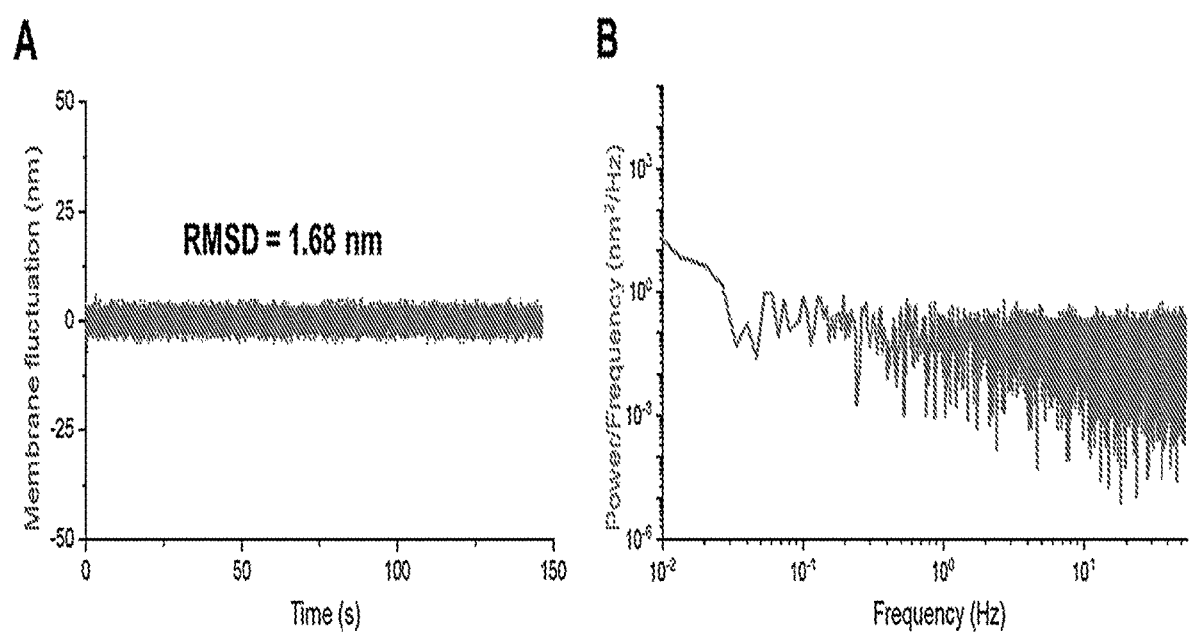
FIG. 5 depicts the background noise analysis. (A) Membrane fluctuation of a fixed cell. (B) The corresponding power spectral density of the fixed cell.
Figure 6:
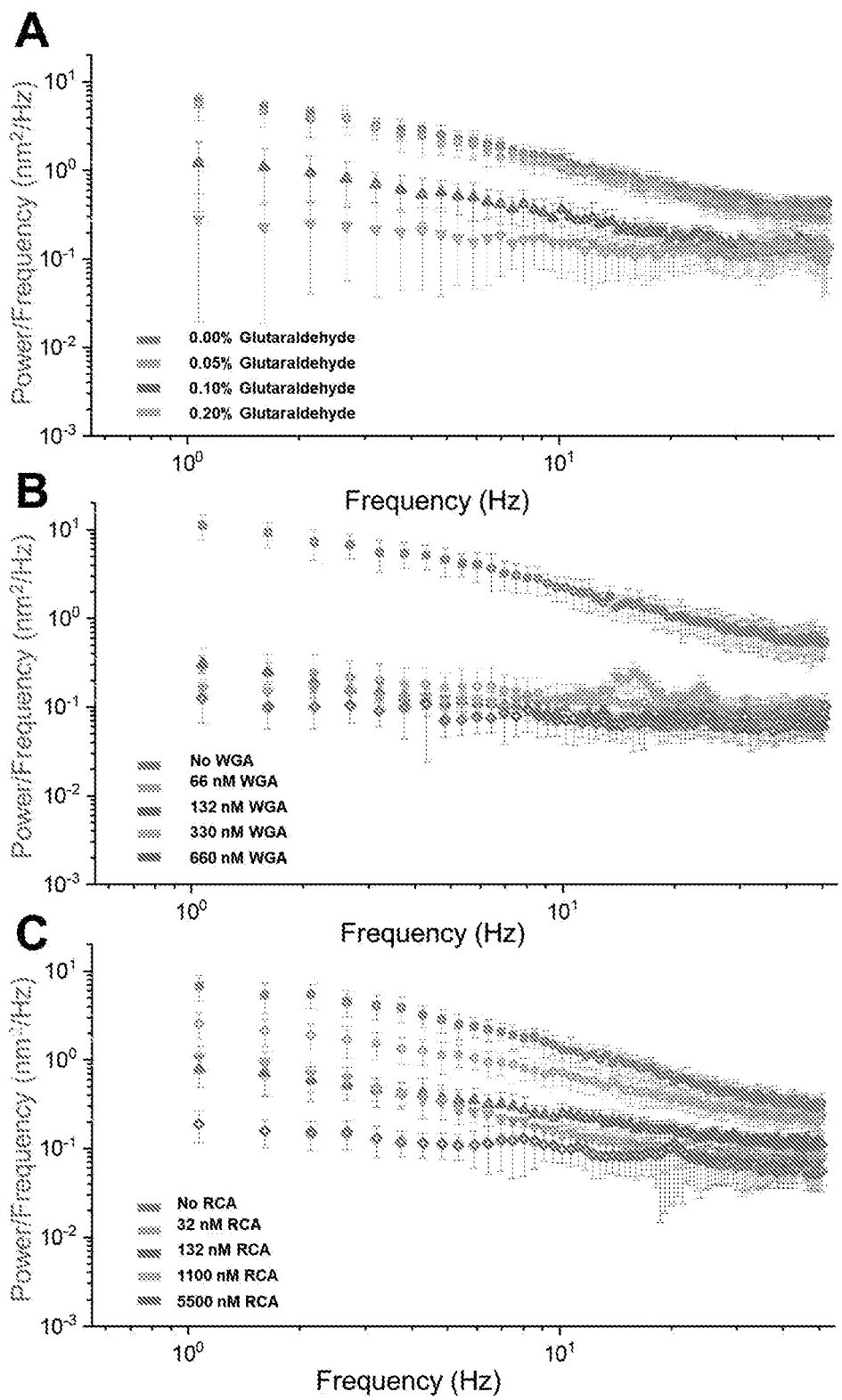
FIG. 6 depicts the statistic power spectra density analysis. (A) Mean PSD of 10 red blood cells under glutaraldehyde treatments with different concentrations. (B) Mean PSD of 10 red blood cells under WGA binding with different concentrations. (C) Mean PSD of 10 red blood cells under RCA binding with different concentrations.

To examine the effect of fixation on the membrane fluctuations of red blood cell, we modified the actin filament structure of red blood cell by glutaraldehyde treatment, which causes covalent cross-linking between protein molecules and anchors proteins to the cytoskeleton. Typical time traces of the red blood cells membrane fluctuations after glutaraldehyde treatment are shown in FIG. 4, (A) (bottom three lines). The glutaraldehyde treatment reduces the membrane fluctuation amplitude (the root mean square displacement, RMSD) of the red blood cells from 11.59±1.88 nm (FIG. 4, (C), 0.00% Glutaraldehyde, N=10 cells) to 10.48±1.64 nm (FIG. 4, (C), 0.05% Glutaraldehyde, N=6 cells), 5.86±1.62 nm (FIG. 4, (C), 0.10% Glutaraldehyde, N=7 cells) and 3.16±0.94 nm (FIG. 4, (C), 0.20% Glutaraldehyde, N=8 cells) which is close to the system background noise level (FIG. 5, (A)). We attribute the drastic decrease in the membrane fluctuations by the glutaraldehyde treatment to the membrane crosslinking, which led to a large increase in the rigidity of the cellular membrane. This is also reflected in the cell mechanic properties of the membrane fluctuations of the glutaraldehyde treated cells (FIG. 4, (D), FIG. 6, (A)). The glutaraldehyde treatment increased the effective local spring constant $\kappa_e$ of the red blood cells from 32.49±7.95 μN/m (FIG. 4, (D), 0.00% Glutaraldehyde, N=10 cells) to 39.73±10.67 μN/m (FIG. 4, (D), 0.05% Glutaraldehyde, N=6 cells), 141.8±62.9 μN/m (FIG. 4, (D), 0.10% Glutaraldehyde, N=7 cells), and 491.1±203.4 μN/m (FIG. 4, (D), 0.20% Glutaraldehyde, N=7 cells). The effective local spring constant $\kappa_e$ of the glutaraldehyde treated cells are nearly an order of magnitude bigger than those of the untreated red blood cells. That means, the fixation does cause changes in cell mechanics, which may in turn lead to the false result in cell dynamic detection, making it necessary to work directly with the live cells.

iii. Membrane Fluctuations Changes with Glycoprotein Binding

To demonstrate the capability of molecular binding detection in live cells, we measured the membrane fluctuation changes induced by the glycoprotein binding. Glycoproteins are critical for cell recognition and communication, and lectins are carbohydrate-binding proteins that recognize and bind to the specific sugar groups of glycoproteins on cell surfaces for regulation of cell adhesion and synthesis of glycoproteins. We studied the binding of wheat germ agglutinin (WGA; molecular weight, 35 kDa), a lectin that recognizes N-acetylglucosamine (GlcNAc) and sialic acid groups on the surface of red blood cells, and *Ricinus communis* agglutinin ($RCA_{120}$, molecular weight, 120 kDa) which specifically binds to N-acetyllactosamine (LacNAc) and galactose on red blood cell membrane.

Similarly, the membrane fluctuations of live red blood cells and those under glycoprotein binding were tracked, and the corresponding PSD was obtained using fast Fourier transform (FFT) for spectrum analysis. For glycoprotein binding effects study, different concentrations of WGA (66 nM, 132 nM, 330 nM and 660 nM) and RCA (32 nM, 132 nM, 1100 nM and 5500 nM) were introduced to the surface of red blood cell for 150 seconds treatment, and the real time images were recorded with the 40× phase contrast objective to reveal the cell edge for membrane fluctuation tracking.

Figure 7:
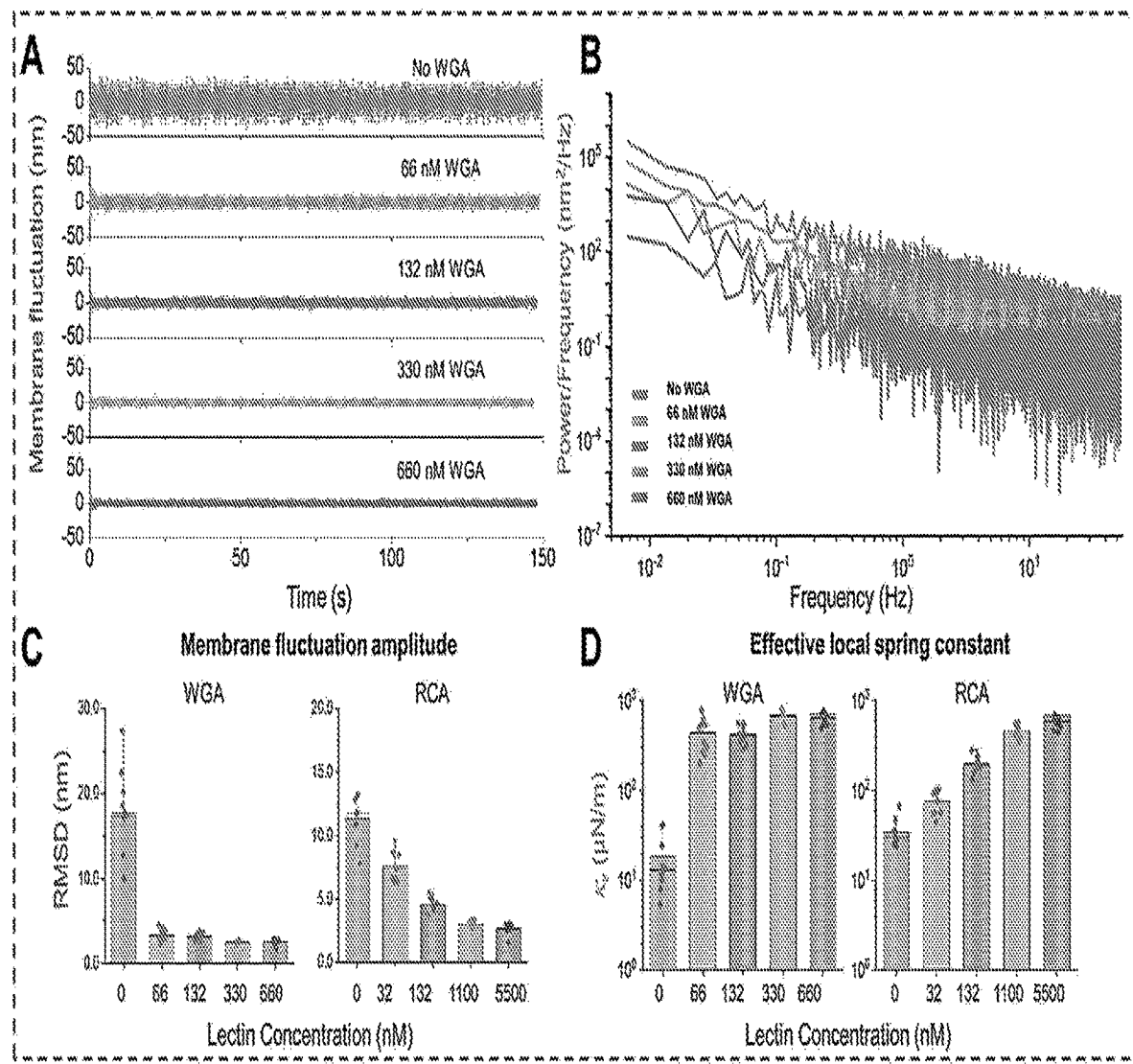
FIG. 7 depicts the representative membrane fluctuations changes with glycoprotein binding. (A) Representative membrane fluctuations of live red blood cells under wheat germ agglutinin (WGA) binding with different concentrations. (B) The corresponding power spectrum density (PSD) spectrum of the cell membrane fluctuations. (C) Statistic of the membrane fluctuation amplitude of multiple red blood cells with WGA and Ricinus communis agglutinin (RCA) binding. (D) Statistic of the calculated effective local spring constant $\kappa_e$ of multiple red blood cells with WGA and RCA binding.

Typical time traces of the red blood cells membrane fluctuations with glycoprotein binding are shown in FIG. 7. The WGA binding reduces the membrane fluctuations of the red blood cells from 14.30±3.12 nm (FIG. 7, (C), left, no WGA, N=10 cells) to 3.29±0.75 nm (FIG. 7, (C), left, 66 nM WGA, N=10 cells), 3.12±0.36 nm (FIG. 7, (C), left, 132 nM WGA, N=10 cells), 2.49±0.22 nm (FIG. 7, (C), left, 330 nM WGA, N=10 cells) and 2.50±0.36 nm (FIG. 7, (C), left, 660 nM, N=10 cells), displaying a rapid decreasing and saturation process. This is also reflected in the cell mechanic properties of the membrane fluctuations of the WGA binding cells (FIG. 7, (D), left, FIG. 6, (B)). The mean effective local spring constant $\kappa_e$ of 10 cells in FIG. 7, (C), showed that the cell mechanical property changed during WGA binding, which may be due to the agglutinin function of the lectin. The WGA binding increased the effective local spring constant $\kappa_e$ of the red blood cells from 18.34±13.03 μN/m (FIG. 7, (D), left, no WGA, N=10 cells) to 438.2±192.1 μN/m (FIG. 7, (D), left, 66 nM WGA, N=10 cells), 429.2±94.87 μN/m (FIG. 7, (D), left, 132 nM WGA, N=10 cells), 677.8±114.9 μN/m (FIG. 7, (D), left, 330 nM WGA, N=10 cells, N=7 cells), and 712.0±274.0 μN/m (FIG. 7, (D), left, 660 nM, N=10 cells).

As for RCA binding, the RMSD of the red blood cell membrane fluctuations was found to decrease from 14.09±3.41 nm (FIG. 7, (C), right, no RCA, N=10 cells) to 7.61±1.15 nm (FIG. 7, (C), right, 32 nM RCA, N=10 cells), 4.62±0.51 nm (FIG. 7, (C), right, 132 nM RCA, N=10 cells), 2.99±0.24 nm (FIG. 7, (C), right, 1100 nM RCA, N=10 cells) and 2.60±0.43 nm (FIG. 7, (C), right, 5500 nM RCA, N=10 cells) with a slightly slow change. The statistic of the effective local spring constant $\kappa_e$ of the red blood cell membrane fluctuations with RCA binding is plotted in FIG. 7, (D) (right), revealing smaller membrane mechanical change compared to WGA (FIG. 7, (D) (left)). The RCA binding increased the effective local spring constant $\kappa_e$ of the red blood cells from 34.71±13.49 μN/m (FIG. 7, (D), right, no RCA, N=10 cells) to 75.68±21.54 μN/m (FIG. 7, (D), right, 32 nM RCA, N=10 cells), 200.1±44.56 μN/m (FIG. 2D, right, red bar, FIG. 7, (D), right, 132 nM RCA, N=10 cells), 466.7±71.92 μN/m (FIG. 7, (D), right, 1100 nM RCA, N=10 cells, N=7 cells), and 688.8±396.5 μN/m (FIG. 7, (D), right, 5500 nM RCA, N=10 cells). Both WGA and RCA bond to the red blood cell surface and induced obvious cell fluctuation and mechanical property change, which can be used for real time molecular interaction detection.

iv. Binding Kinetics Determination with Live Cell Membrane Fluctuations

In our previous work, we mainly focused on the fixed cells for binding kinetic measurements, because it minimizes cell fluctuation. However, it has been shown that several amino acids (e.g., lysine and tryptophan side chains) can be easily cross-linked by fixation, leading to the false binding kinetics. To eliminate the fixation effect, it is critical to develop a method for the binding kinetic measurements on live cells. As we show earlier, the molecular binding can cause the cell membrane fluctuation changes in single live cells, which is a good way for binding kinetic measurement without any external treatment. To demonstrate this kinetic measurement capability, we imaged the whole process of WGA interaction with red blood cells in real time for binding curve determination. First, 1× Alsever's buffer solution was injected in the chamber to flow over the red blood cells with a flow rate of 300 μL/min for 150 seconds to obtain a baseline. Then, WGA (in 1× Alsever's buffer solution) was introduced for another 150 seconds to allow the binding (association) process of WGA with the glycoproteins on the cell surface. After the association process, the flow was switched back to 1× Alsever's buffer solution for another 150 seconds to allow dissociation of WGA from the cell surface.

Figure 8:
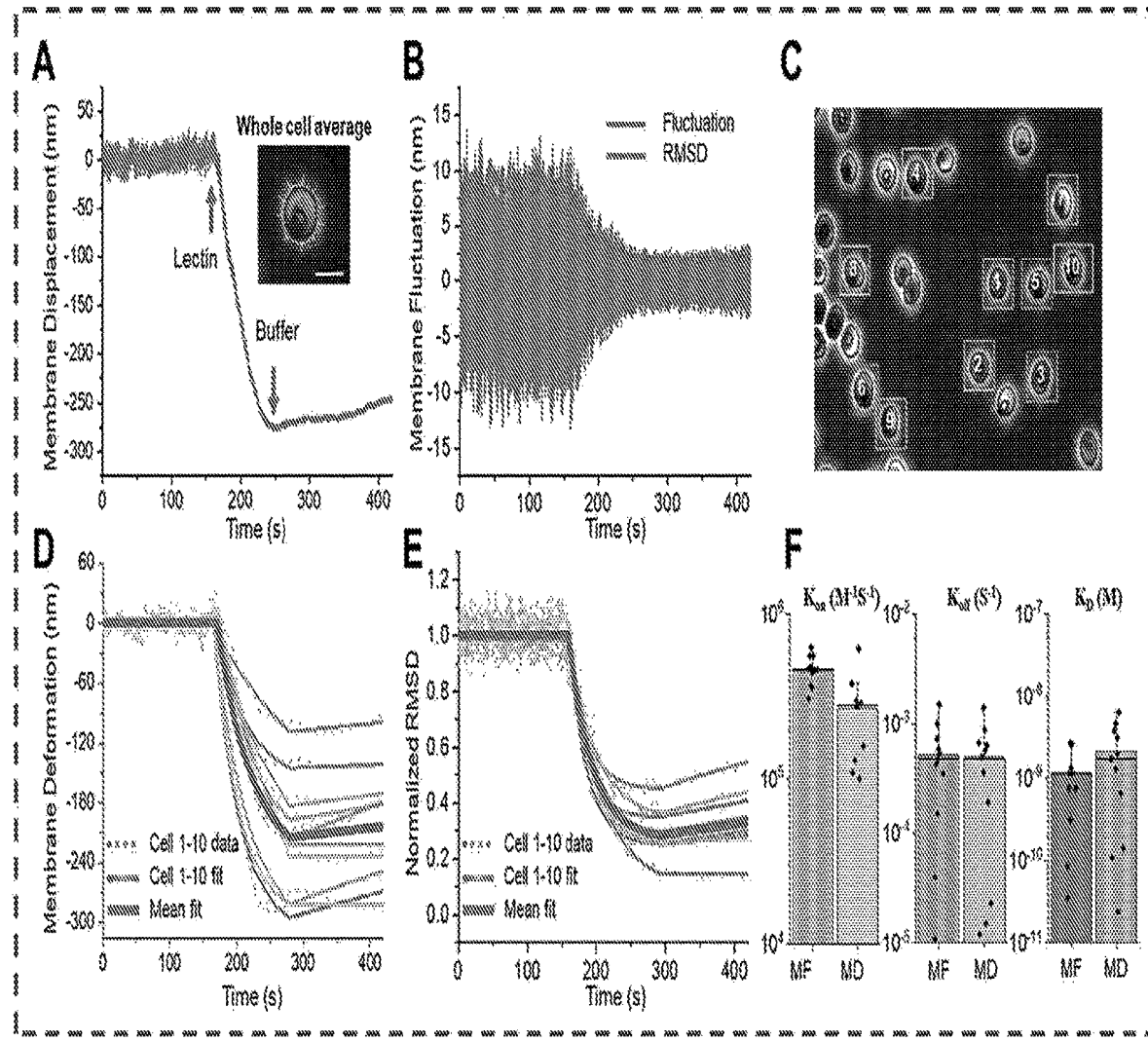
FIG. 8 depicts the comparison of the binding curves determined form slow membrane deformation and fast membrane fluctuation. (A) Real time cell membrane displacement during lectin binding. (B) Cell membrane fluctuation after high-pass filter (>1 Hz, gray line) and the calculated root mean square displacement (RMSD, red line). (C) Optical images of red blood cells with 40× phase contrast objectives and the 10 individual cells marked for binding curves determination. (D) Binding curves of the marked 10 red blood cells determined form slow membrane deformation (<1 Hz) for kinetic measurements. (E) Binding curves of the marked 10 red blood cells determined form fast membrane fluctuation (>1 Hz) for kinetic measurements. (F) Comparison of the binding kinetic constants ($K_{on}$, $K_{off}$, $K_D$) determined form slow membrane deformation and fast membrane fluctuation.
Figure 9:
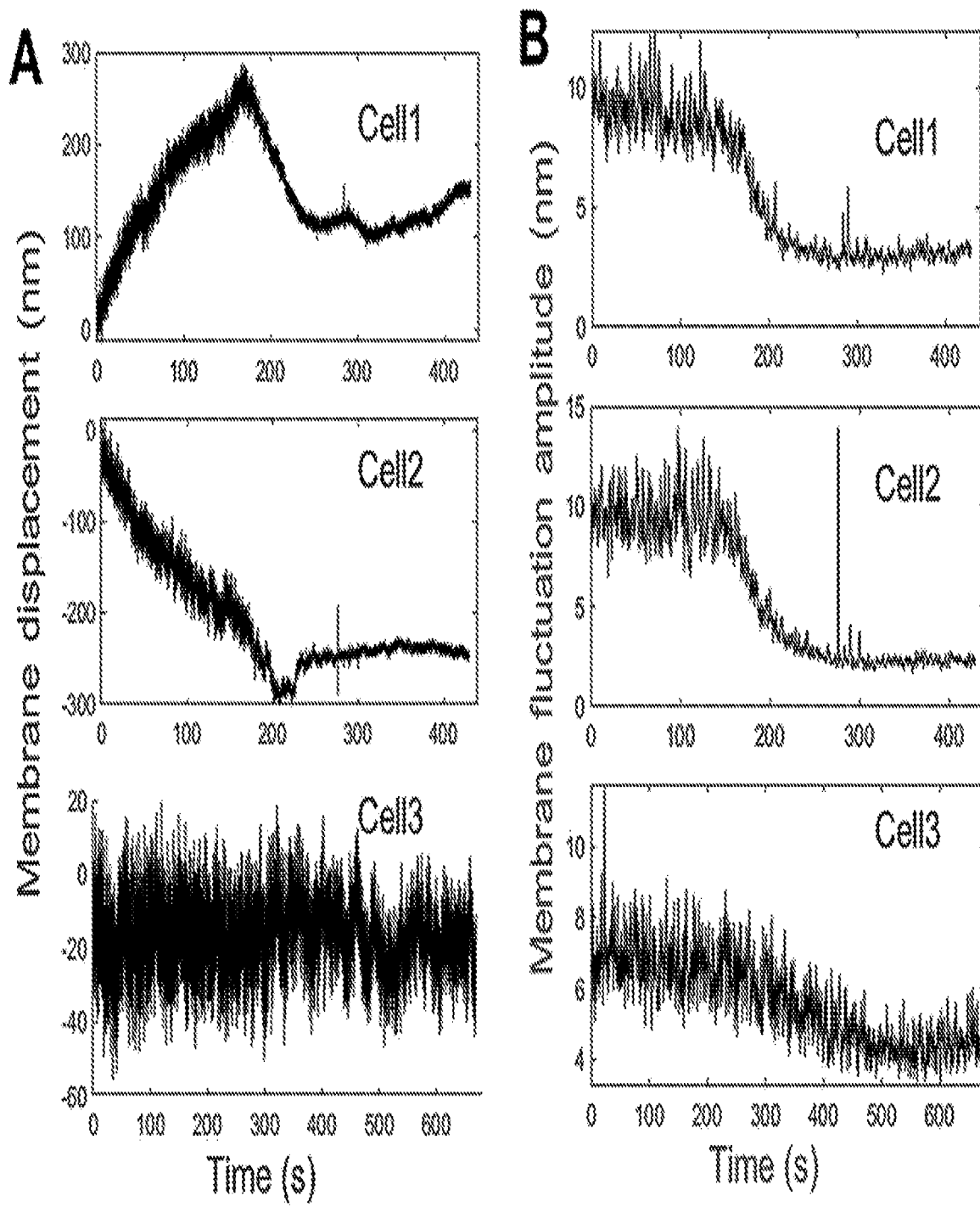
FIG. 9 depicts examples of the binding curves determined form slow membrane deformation and fast membrane fluctuation. (A) Binding curves of 3 representative RBCs determined form slow membrane deformation (<1 Hz). (B) Binding curves of 3 representative RBCs determined form fast membrane fluctuation (>1 Hz). Binding curve of Cell1 and Cell2 are obtained with 330 nM WGA binding, while binding curve of Cell 3 is from 32 nM RCA binding.

As shown in FIG. 8, (A), the live red blood cell contracted gradually during the association process and expanded back during the dissociation process. By tracking cell membrane displacement vs. time, we can obtain the typical binding curves. To improve the signal to noise ratio, the whole cell averaged membrane displacement was tracked for binding kinetics measurement. The tracked binding curve includes both the slow timescale (low frequency membrane displacement, <1 Hz) membrane deformation and the fast timescale (high frequency micro-motion, >1 Hz) membrane fluctuations, both of which can be used for binding kinetic determination. The slow timescale membrane deformation change was used for fixed cell binding measurement in our previous work, however, at slow timescales (low frequencies), various types of system and environmental noise are hard to isolate, including the light source noise, mechanical vibration, temperature instability, and ambient acoustic noise. Especially for live cells, the spontaneous cell movement can cause large variation in slow membrane deformation signal, making it difficult for quantitative molecular binding detection (FIG. 9). For a more robust membrane motion detection in live cells, the fast timescale membrane fluctuation was extracted for binding kinetic measurements. First, the tracked binding curve (FIG. 8, (A)) was filtered with a high pass filter to eliminate the slow-motion changes below 1 Hz, and obtained the high frequency membrane fluctuations (FIG. 8, (B), gray line). Then, the fluctuation amplitude (RMSD) was extracted every 1 second for binding curve plot (FIG. 8, (B), line).

The present method measures binding kinetics on single live cells, which offers an opportunity to measure cell-to-cell variability in the binding kinetics. We measured the binding of WGA to the glycoprotein receptor on 10 red blood cells (FIG. 8, (C)) on the same microfluidic chip simultaneously for cell-cell variation study. FIG. 8, (D)-(F) are the comparison of the binding curves and corresponding kinetic constants of these 10 red blood cells determined form slow membrane deformation and fast membrane fluctuation. It is obvious that the binding curve extracted from membrane fluctuations are more consistent for accurate binding kinetics fitting, while the kinetic constant results (FIG. 8, (F)) form both slow timescale membrane deformation (MD) and fast time scale membrane fluctuation (MF) were in good consistency. The statistic results of the kinetic constants show about 2 folds difference in the associate rate constant and about 10 folds different in the dissociate rate constant among the 10 cells, revealing obvious heterogeneity in single cells.

v. Molecular Interaction of Different Lectins on Single RBC

Glycoproteins are abundantly located on the membranes of red blood cells and play important roles in cell-cell interaction, in regulating cell mechanical properties and in a variety of physiological process including hemostasis and thrombosis. Lectins have been widely used for agglutination of red blood cells, and different types of lectin have specific binding sites for cellular functions. Studying the interaction of different lectins with membrane of red blood cells will help revealing the glycoprotein expression profile, and further understand the structure and functions of red blood cells, which has not been investigated before, especially in single live cells.

To further validate the capability of this method and explore the glycoprotein expression profile on single red blood cell, various glycoproteins binding interaction was measured. For demonstration, five typical lectins were studied, including wheat germ agglutinin (WGA, binds to N-acetylglucosamine (GlcNAc)), *Ricinus communis* agglutinin (RCA, binds to terminal β-D-galactose (Galβ)), phytohaemagglutinin (PHA, binds to biantennary complex N-linked glycans), concanavalin A (Con A, binds to α-linked Man, branched and terminal) and lectin from *Pisum sativum* (PSA, binds to core fucosylated terminal LacNAc, Man, GlcNAc). Similarly, after the baseline recording, the lectin solutions were introduced to the cell surface for association binding, and after binding, the buffer solution was switched back to allow dissociation of the lectin from the cell surface. By tracking the lectin binding induced membrane fluctuations, the binding capabilities of different lectins to live RBC were examined.

Figure 10:
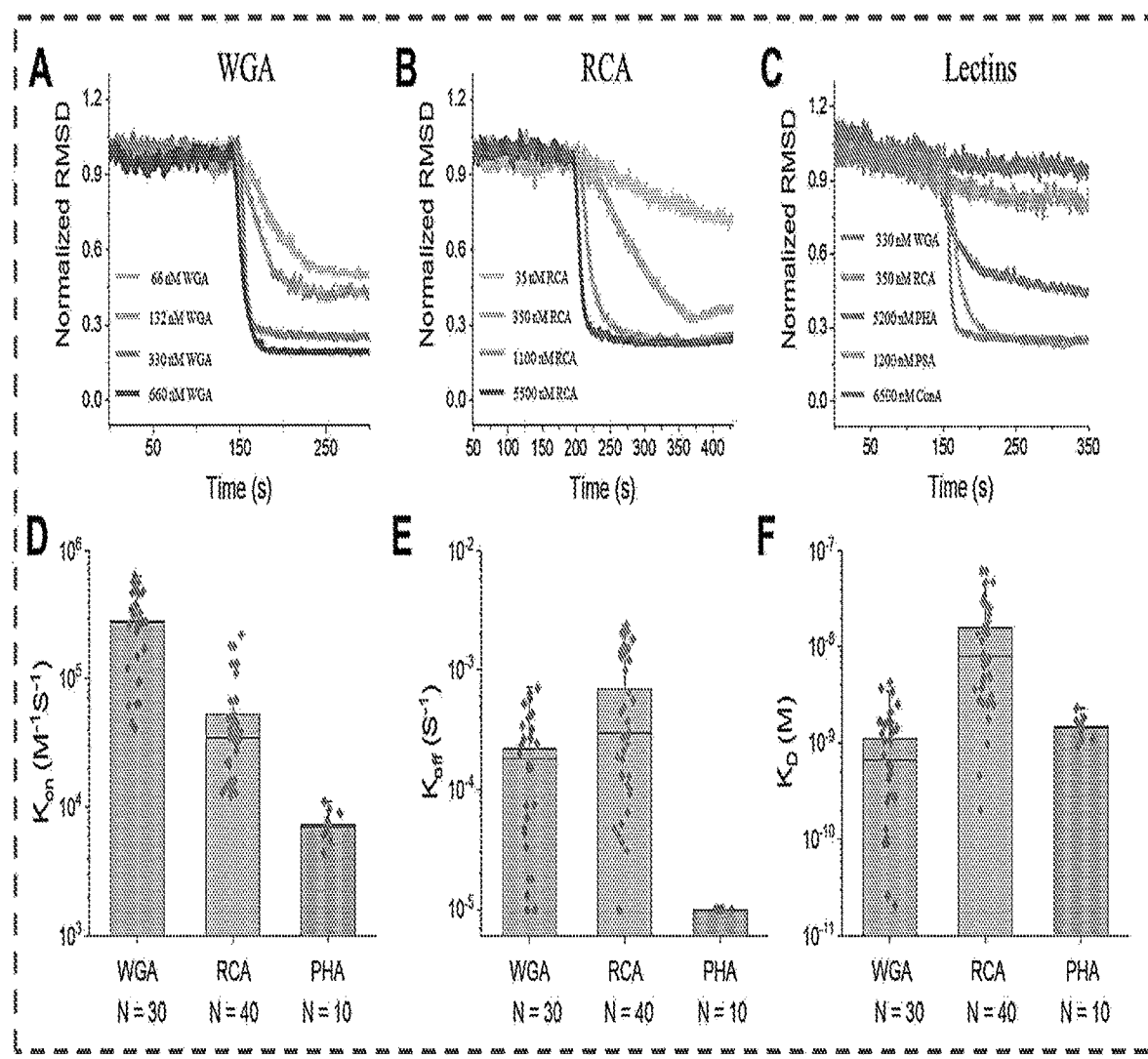
FIG. 10 depicts the binding kinetics of various glycoproteins. Binding curves of (A) different concentrations of WGA, (B) different concentrations of RCA, and (C) different lectins (WGA, RCA, PHA, PSA, ConA). Static comparison of (D) associate rate constant $K_{on}$, (E) dissociate rate constant $K_{off}$, and (F) dissociation constant $K_D$ for three lectins (WGA, RCA, PHA) with obvious binding interaction with red blood cells.

FIG. 10, (A), are the binding curves of WGA with different concentrations (66 nM, 132 nM, 330 nM, 660 nM), while FIG. 10, (B), show the binding curves from four concentrations (35 nM, 350 nM, 1100 nM, 5500 nM) of RCA. As for other lectins (PHA, PSA, ConA), no obvious signals were observed in low concentrations. FIG. 10, (C), is the comparison of binding curves of the five tested lectins. WGA and RCA with low concentrations show fast interaction and large binding signals indicating high expression of their glycoprotein targets (GlcNAc, Galβ), while the binding interaction of PHA was slower and only detected at high concentration (5500 nM). Whereas two other glycoproteins, ConA and PSA, targeting α-D-mannosyl residues, showed minimal interactions with red blood cells even at high concentrations, revealing the minimal expression of the terminal mannose on red blood cells. Therefore, the binding signals of different lectins demonstrated quite different interactions with live red blood cell membrane in both strength and kinetics, indicating the glycoproteins expression difference in red blood cells.

By fitting the binding curves obtained at different concentrations with a 1:1 binding kinetics model, the association rate constant ($k_{on}$), dissociation rate constant ($k_{off}$), and dissociation constant ($K_D$) were found to be $k_{on}$=2.86±1.74× $10^5$ $M^{-1}$ $s^{-1}$, $k_{off}$=2.18±2.0×$10^{-4}$ $s^{-1}$ and $K_D$=1.09±1.13 nM for WGA (N=30 cells), and $k_{on}$=5.23±5.20×$10^4$ $M^{-1}$ $s^{-1}$, $k_{off}$=6.91±7.14×$10^{-4}$ $s^{-1}$ and $K_D$=16.2±17.8 nM for RCA (N=40 cells), and $k_{on}$=7.35±2.00×$10^3$ $M^{-1}$ $s^{-1}$, $k_{off}$=1.01±0.01×$10^{-5}$ $s^{-1}$ and $K_D$=1.45±4.04 nM for PHA (N=10 cells). Although the dissociation constant ($K_D$) of WGA and PHA are similar (about 1 nM), their rate constants are quite different. For WGA interaction, the kinetic results show fast association (about $10^5$ $M^{-1}$ $s^{-1}$) and tight binding (about $10^{-4}$ $s^{-1}$), while for PHA interaction, the association process is about 40 times slower (about $10^3$ $M^{-1}$ $s^{-1}$) and the dissociation process is also about 20 times slower. These results show the significance of real time kinetic measurements for molecular binding quantification.

3. CONCLUSIONS

We described here a label-free optical detection method to measure the kinetics of molecular binding interaction with membrane protein receptors on single live cells. The method measures the molecular binding induced fast timescale cell membrane fluctuations change of the red blood cells with sub-nanometer precision. Using the method, we studied the molecular interactions of different glycoproteins with red blood cells, demonstrating a unique capability of measuring molecular binding kinetics with membrane proteins on live cells. We performed the spectrum analysis and related the membrane fluctuation changes to the cell elastic properties with a fluctuation-based approach and validated the model by changing the cell stiffness with glutaraldehyde treatment. The high-precision membrane fluctuation tracking method provides a non-invasive way for both cell mechanics and molecular binding interaction measurement. The single-cell detection capability revealed variability in the binding kinetics of a membrane protein receptor expressed on different cells, enabling the study of heterogeneity in the membrane protein binding. Furthermore, studying the interaction of different lectins with membrane of red blood cells reveals the glycoprotein expression profile in single cell surface, which helps understanding the structure and functions of red blood cells.

We claim:

1. A system for quantitative detection and analysis of mechanics and molecular binding kinetics of a substance with surface membrane proteins of a biological object, the system comprising:
   a) a housing configured to hold the biological object;
   b) a microfluidic injector configured for fluid communication with the housing to introduce the substance to the biological object;
   c) an optical imaging apparatus configured to capture a time sequence of optical images of the biological object; and
   d) a processor configured to receive the time sequence of optical images from the optical imaging apparatus and to track membrane fluctuation amplitude changes of the biological object associated with binding of the substance with the surface membrane proteins from the time sequence of optical images,
   wherein the processor comprises an image processing algorithm that:
   filters a measured membrane displacement at a frequency of about 1 Hz or more for membrane fluctuation tracking;
   calculates a first membrane fluctuation amplitude with a root mean square displacement (RMSD) of about a 150 second membrane fluctuation signal; and
   determines an effective local spring constant to produce a cell mechanics determination for the biological object; and,
   calculates an average over a whole membrane displacement;
   filters the whole membrane displacement at a frequency of about 1 Hz or more for membrane fluctuation tracking; and
   calculates a second membrane fluctuation amplitude with a RMSD of about every 1 second to determine binding curves to produce a binding kinetics determination for the biological object.

2. The system of claim 1, wherein the image processing algorithm calculates the membrane fluctuation amplitude changes using a differential image intensity analysis.

3. The system of claim 2, wherein the differential image intensity analysis comprises:
   a) defining a region in the time sequence of optical images that is substantially rectangular in shape and includes an edge of the biological object;
   b) dividing the region into a first half and a second half along the edge and denoting an optical intensity value to each of the first half and the second half, wherein the first half falls outside of the biological object and the second half falls inside of the biological object;
   c) determining an edge movement by computing (A−B)/(A+B), wherein A is the optical intensity value of the first half, B is the optical intensity value of the second half; and
   c) calculating a lateral displacement value (Δh) by:

$$\Delta h = \alpha \frac{A-B}{A+B}, \quad (1)$$

wherein α is a calibration factor determined by shifting the region by different numbers of pixels from outside to inside of the biological object in a direction perpendicular to a tangent line at the boundary of the biological object; and
   d) subtracting common noise from the calculated lateral displacement value, thereby obtaining the membrane fluctuation amplitude changes associated with the binding.

4. The system of claim 3, wherein the common noise is caused by variations of light intensity used by the optical imaging apparatus and/or caused by mechanical perturbation.

5. The system of claim 1, wherein the optical imaging apparatus comprises a phase contrast objective.

6. The system of claim 1, wherein the optical imaging apparatus comprises a CCD or CMOS camera.

7. The system of claim 1, wherein the biological object comprises a biological cell, tissue or virus.

8. The system of claim 7, wherein the biological object comprises a red blood cell.

9. The system of claim 1, wherein the substance is selected from the group consisting of proteins, nucleic acids, amino acids, peptides, hormones, drugs, metabolites, minerals, and ions.

10. A method for quantitative detection and analysis of mechanics and molecular binding kinetics of a substance with surface membrane proteins of a biological object, the method comprising:
   a) introducing the substance to interact with the biological object;
   b) capturing a time sequence of optical images of the biological object;
   c) tracking membrane fluctuation amplitude changes of the biological object associated with binding of the substance with the surface membrane proteins; and
   d) producing a cell mechanics determination for the biological object by filters a measured membrane displacement at a frequency of about 1 Hz or more for membrane fluctuation tracking, calculating a first membrane fluctuation amplitude with a root mean square displacement (RMSD) of about a 150 second membrane fluctuation signal, and determining an effective local spring constant; and e) producing a binding kinetics determination for the biological object by calculating an average over a whole membrane displacement, filtering the whole membrane displacement at a frequency of about 1 Hz or more for membrane fluctuation tracking, and calculating a second membrane fluctuation amplitude with a root mean square displacement (RMSD) of about every 1 second to determine binding curves.

11. The method of claim 10, wherein the membrane fluctuation amplitude changes are determined using a differential image intensity analysis.

12. The method of claim 11, wherein the differential image intensity analysis comprises:

a) defining a region in the time sequence of optical images that is substantially rectangular in shape and includes an edge of the biological object;

b) dividing the region into a first half and a second half along the edge and denoting an optical intensity value to each of the first half and the second half, wherein the first half falls outside of the biological object and the second half falls inside of the biological object;

c) determining an edge movement by computing (A−B)/(A+B), wherein A is the optical intensity value of the first half, B is the optical intensity value of the second half; and c) calculating a lateral displacement value ($\Delta h$) by:

$$\Delta h = \alpha \frac{A-B}{A+B}, \quad (1)$$

wherein $\alpha$ is a calibration factor determined by shifting the region by different numbers of pixels from outside to inside of the biological object in a direction perpendicular to a tangent line at the boundary of the biological object; and d) subtracting common noise from the calculated lateral displacement value, thereby obtaining the membrane fluctuation amplitude changes associated with the binding.

13. The method of claim 12, wherein the common noise is caused by variations of light intensity used to capture the time sequence of optical images of the biological object and/or mechanical perturbation.

14. The method of claim 10, wherein the molecular binding kinetic of the biological object is proportional to the membrane fluctuation amplitude changes.

15. The method of claim 10, further comprising determining one or more binding kinetic constants from the time sequence of images.

16. The method of claim 15, wherein the one or more binding kinetic constants comprise association rate constant ($k_{on}$), dissociation rate constant ($k_{off}$), dissociation constant ($K_D$), and/or effective local spring constant ($k_e$).

17. The method of claim 10, wherein the time sequence of optical images of the biological object are obtained using an optical imaging apparatus comprising a phase contrast objective.

18. The method of claim 17, wherein the optical imaging apparatus further comprises a CCD or CMOS camera.

19. The method of claim 10, wherein the biological object comprises a biological cell, tissue or virus.

20. The method of claim 19, wherein the biological object comprises a red blood cell.

* * * * *